US011954388B2

(12) United States Patent
Toyama

(10) Patent No.: US 11,954,388 B2
(45) Date of Patent: Apr. 9, 2024

(54) PRINTING APPARATUS, CONTROL METHOD, AND STORAGE MEDIUM FOR TRANSMITTING EXECUTION HISTORY INFORMATION TO A CLOUD PRINT SERVICE

(71) Applicant: CANON KABUSHIKI KAISHA, Tokyo (JP)

(72) Inventor: Masaki Toyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/051,466

(22) Filed: Oct. 31, 2022

(65) Prior Publication Data

US 2023/0141762 A1    May 11, 2023

(30) Foreign Application Priority Data

Nov. 5, 2021   (JP) ................. 2021-180823

(51) Int. Cl.
*G06F 3/12* (2006.01)
(52) U.S. Cl.
CPC .......... *G06F 3/1287* (2013.01); *G06F 3/1203* (2013.01); *G06F 3/1236* (2013.01); *G06F 3/1238* (2013.01); *G06F 3/1273* (2013.01)
(58) Field of Classification Search
None
See application file for complete search history.

(56) References Cited

U.S. PATENT DOCUMENTS

| | | | | |
|---|---|---|---|---|
| 2013/0044343 | A1* | 2/2013 | Matsugashita | ........ G06F 3/1222 358/1.14 |
| 2015/0092233 | A1* | 4/2015 | Park | ................... H04N 1/00244 358/1.15 |
| 2016/0364192 | A1* | 12/2016 | Fujii | ................... H04N 1/00244 |
| 2020/0374187 | A1* | 11/2020 | Sako | ................... H04L 41/0813 |
| 2021/0042071 | A1* | 2/2021 | Sako | ..................... G06F 3/1203 |
| 2021/0165616 | A1* | 6/2021 | Yasuda | ................. G06F 3/1259 |
| 2022/0019394 | A1* | 1/2022 | Sako | ..................... G06F 3/1288 |
| 2022/0308813 | A1* | 9/2022 | Nakashima | ........... G06F 3/1268 |

FOREIGN PATENT DOCUMENTS

JP    2015064794 A    4/2015

* cited by examiner

*Primary Examiner* — Henok Shiferaw
(74) *Attorney, Agent, or Firm* — Canon U.S.A., Inc. IP Division

(57) ABSTRACT

A printing apparatus capable of connecting to a plurality of cloud print services executes a print job received from any one of the plurality of cloud print services, stores identification information for identifying the cloud print service from which the print job is transmitted, and after the print job is executed, transmits execution history information about the print job to the cloud print service from which the print job is transmitted, using the stored identification information.

12 Claims, 11 Drawing Sheets

PRINTING APPARATUS, CONTROL METHOD, AND STORAGE MEDIUM FOR TRANSMITTING EXECUTION HISTORY INFORMATION TO A CLOUD PRINT SERVICE

BACKGROUND

Field

The present disclosure relates to a printing apparatus connected to a cloud print service, a control method, and a storage medium.

Description of the Related Art

It has heretofore been known to perform printing by a user directly transmitting a print job from a client terminal, such as a personal computer (PC), to a printing apparatus. There are cloud print services where printing is performed using cloud services provided on the Internet. Software as a service (SaaS) of multitenant configuration where a plurality of clients uses software resources on the cloud in a shared manner has also been known. Among functions provided to clients by such multitenant SaaS is a cloud print function.

Japanese Patent Application Laid-Open No. 2015-064794 discusses a technique for, if transmission of job history information from a printing apparatus to a job history processing server is not completed, transmitting the unsent job history information to the same job history processing server.

However, according to Japanese Patent Application Laid-Open No. 2015-064794, the transmission destination of the job history information is one or a plurality of predetermined job history processing servers. In other words, the printing apparatus is unable to transmit the job history information to the tenant transmitting the print execution request even if the technique discussed in Japanese Patent Application Laid-Open No. 2015-064794 is applied.

SUMMARY

According to embodiments of the present disclosure, in a case where a printing apparatus can be connected to a plurality of cloud print service tenants and accept execution of printing, each tenant can manage a plurality of print jobs submitted by a user, and provides a print job list to the user. In order for each tenant to present the result of execution of the print jobs by the printing apparatus to the user, the printing apparatus identifies the tenant requesting the execution of printing (transmitting a print execution request) among the plurality of tenants connected and transmits job history information.

According to embodiments of the present disclosure, a printing apparatus that connects to a plurality of cloud printing services includes an execution unit configured to execute a print job received from any one of the plurality of cloud print services, a storage unit configured to store identification information for identifying a cloud print service from which the print job is transmitted, and a transmission unit configured to, after the print job is executed, transmit execution history information about the print job to the cloud print service from which the print job is transmitted, using the stored identification information.

Further features of the present disclosure will become apparent from the following description of exemplary embodiments with reference to the attached drawings.

DESCRIPTION OF THE EMBODIMENTS

Figure 1:
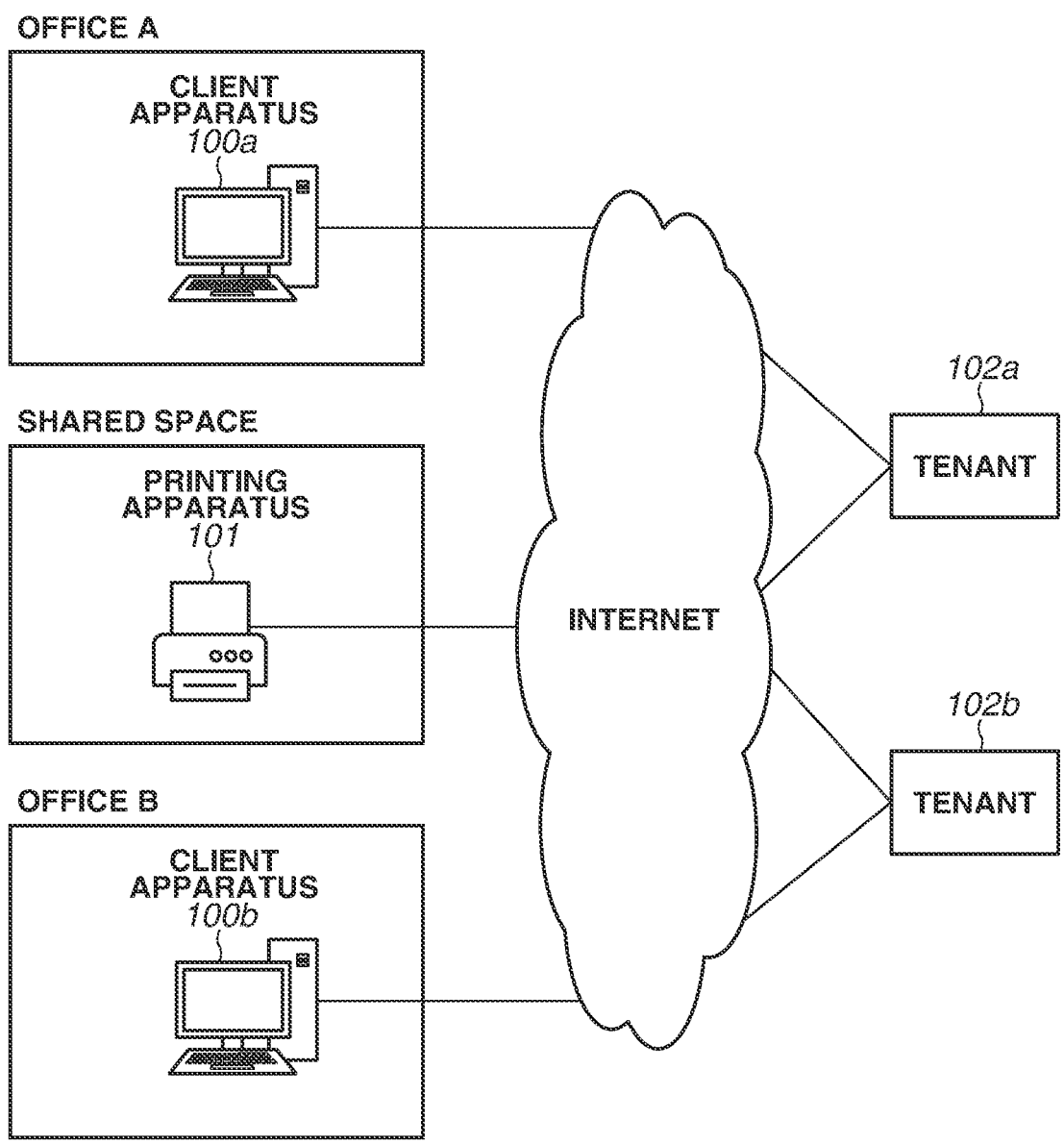
FIG. 1 is a system configuration diagram of a printing system.

FIG. 1 is a diagram for describing an example of a system configuration of a printing system according to an exemplary embodiment.

Client terminals 100a and 100b are installed in respective different offices A and B. A printing apparatus 101 is installed in a shared space that can be used based on a contract with a specific company, such as a shared office and a coworking space. Tenants 102a and 102b are cloud print service tenants and managed by administrators of the offices A and B, respectively. The tenants 102a and 102b are provided as tenants of different cloud print services. The tenants 102a and 102b may be provided as tenants of the same multitenant cloud print service. The cloud print service(s) providing the tenants 102a and 102b does/do not need to be implemented by a single server, and may be implemented by a plurality of function-specific servers or implemented by a plurality of apparatuses for processing distribution. The types of cloud services to be provided are not limited in particular.

The client terminals 100a and 100b are client terminals that submit print jobs to the respective tenants 102a and 102b.

The printing apparatus 101 is a printing apparatus that obtains print jobs from the tenants 102a and 102b and performs print processing.

The foregoing components are communicably connected by a network. Examples of the network include the Internet, a local area network (LAN), a wide area network (WAN), telephone lines, dedicated digital lines, and an Asynchronous Transfer Mode (ATM) network. A communication network constructed by combining such networks may be used.

Figure 2:
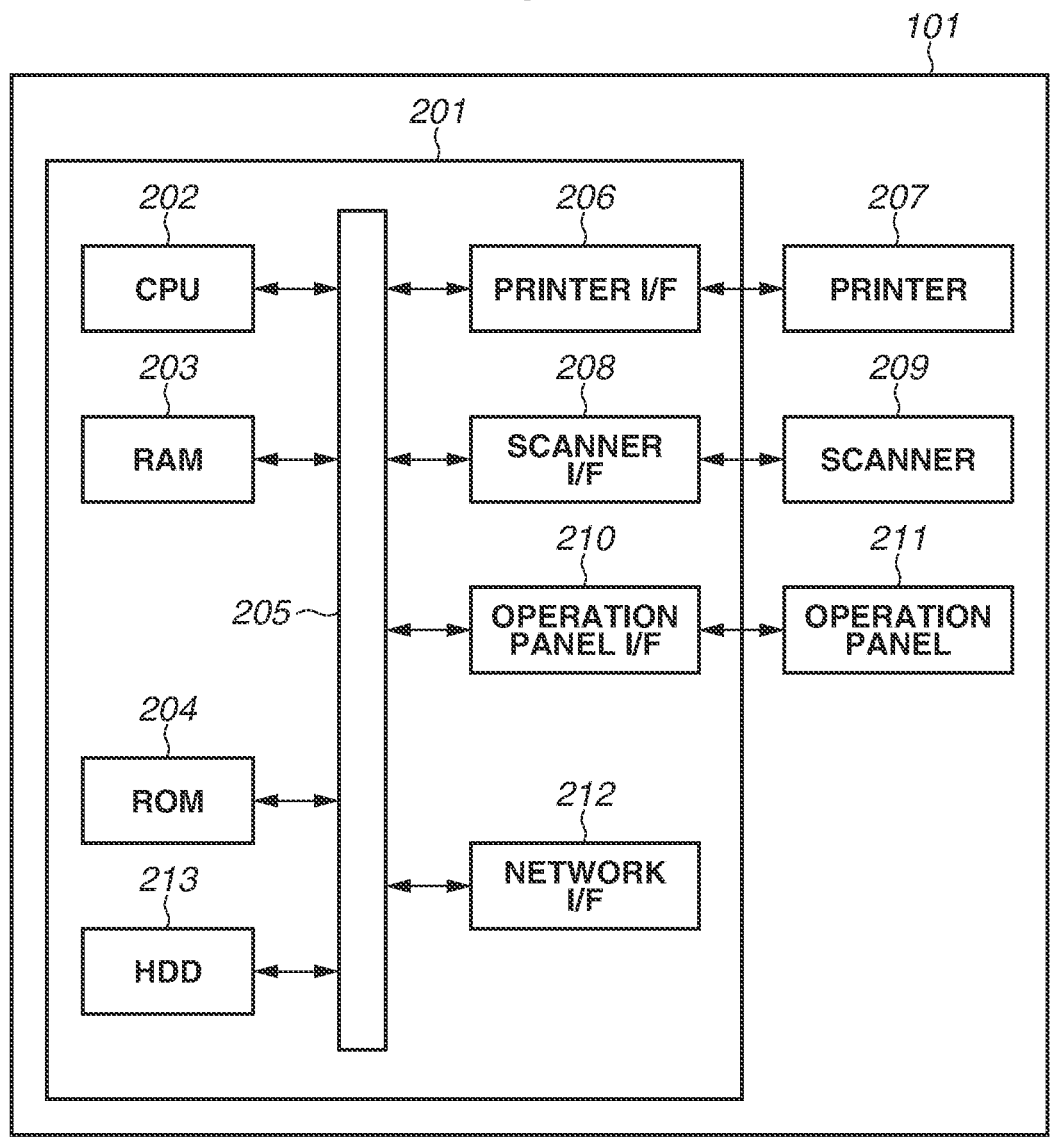
FIG. 2 is a hardware configuration diagram of a printing apparatus.

The printing apparatus 101 according to the present exemplary embodiment will be described with reference to FIG. 2. FIG. 2 is a diagram illustrating a hardware configuration of the printing apparatus 101 according to the present exemplary embodiment. A control unit 201 including a central processing unit (CPU) 202 controls operation of the entire printing apparatus 101. The CPU 202 reads a control program stored in a read-only memory (ROM) 204 and performs various controls, such as communication control. A random access memory (RAM) 203 is used as a temporary storage area, such as a main memory and a work area of the CPU 202. A hard disk drive (HDD) 213 stores data, various programs, and various information tables.

A printer interface (I/F) 206 functions as an I/F for outputting an image signal to a printer 207 (printer engine). A scanner I/F 208 function as an I/F for inputting a read image signal from a scanner 209 (scanner engine). The CPU 202 processes the image signal input from the scanner I/F 208, and outputs the processed image signal to the printer I/F 206 as a recording image signal.

An operation panel I/F 210 connects an operation panel 211 and the control unit 201. The operation panel 211 includes a liquid crystal display unit having a touchscreen function and a keyboard.

A network I/F 212 transmits information to external terminals, such as the client terminals 100a and 100b and the tenants 102a and 102b, and receives various types of information from the external terminals.

The blocks in the control unit 201 are connected by a system bus 205.

Some of the foregoing components 201 to 212 may be applied to an image forming apparatus according to the present exemplary embodiment. The information processing apparatus according to the present exemplary embodiment applies to a client terminal or a server computer in a datacenter for building a cloud service including tenants.

Figure 3:
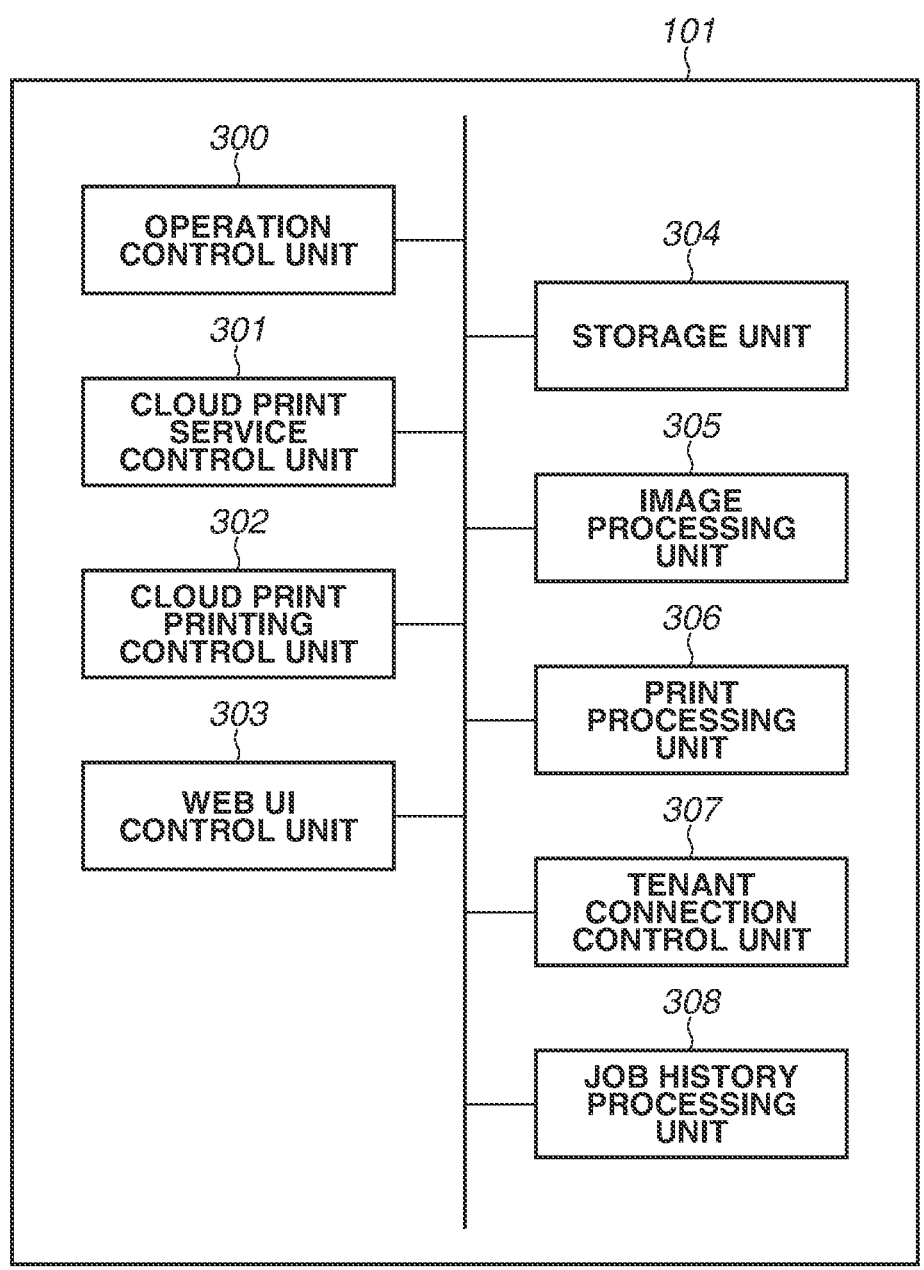
FIG. 3 is a software configuration diagram of the printing apparatus.

FIG. 3 is a diagram for describing a software configuration of the printing apparatus 101. The functional units illustrated in FIG. 3 are implemented by the CPU 202 included in the printing apparatus 101 executing control programs.

An operation control unit 300 controls the operation panel 211. The operation control unit 300 displays an operation menu on the operation panel 211, waits for an instruction input from a user, notifies the other functional units of the content of the accepted instruction, and displays an instruction result on the operation panel 211.

A clout print service control unit 301 analyzes users' instructions received from the client terminals 100a and 100b and the operation control unit 300, and transmits requests to the tenants 102a and 102b. The cloud print service control unit 301 thereby controls cloud print service processing. In the present exemplary embodiment, the cloud print service control unit 301 is unable to simultaneously connect to a plurality of tenants. In other words, in the present exemplary embodiment, the printing apparatus 101 is described to be able to connect to one of the tenants at a timing and switch tenants to be connected (connection destination tenants). However, a part of the present exemplary embodiment may be applied to a printing apparatus that can simultaneously connect to a plurality of tenants.

A cloud print printing control unit 302 controls processing for transferring print job data 722 to be described below received from the tenants 102a and 102b to an image processing unit 305 along with print instructions. Similarly to the cloud print service control unit 301, the cloud print printing control unit 302 does not simultaneously connect to a plurality of tenants. A web user interface (UI) control unit 303 controls a web UI for a user to make device setting operations from a personal computer (PC) using the Hypertext Transfer Protocol (HTTP).

A storage unit 304 stores specified data into the ROM 204 or the HDD 213 or reads stored data based on instructions from other functional units. The image processing unit 305 performs processing for rendering a print job into print image data. A print processing unit 306 performs processing for transmitting the image data rendered by the image processing unit 305 to the printer 207 via the printer I/F 206 as an image signal, and printing the image signal.

A tenant connection control unit 307 manages information about a plurality of tenants for the cloud print service control unit 301 and the cloud print printing control unit 302 to be connected to, and controls switching of connection destination tenants. The printing apparatus 101 according to the present exemplary embodiment may be a printing apparatus that can simultaneously connect to a plurality of tenants. A job history processing unit 308 performs processing for recording and managing the result of the print processing by the print processing unit 306 as job history information.

Figure 4:
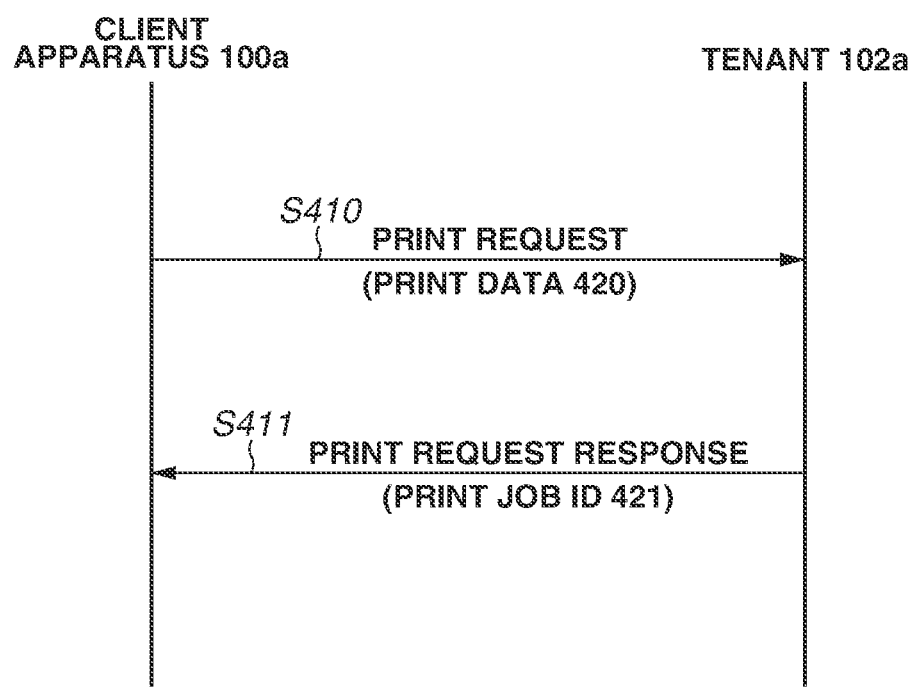
FIG. 4 illustrates a processing sequence for submitting a print job.

FIG. 4 is a diagram for describing an example of a processing sequence for submitting a print job in the printing system according to the present exemplary embodiment. While the processing sequence is described by using the client terminal 100a and the tenant 102a as an example, a similar processing sequence applies to the client terminal 100b and the tenant 102b.

The user initially transmits a print request S410 including print data 420 to the tenant 102a via the web UI using a web UI client on the client terminal 100a.

Figure 5:
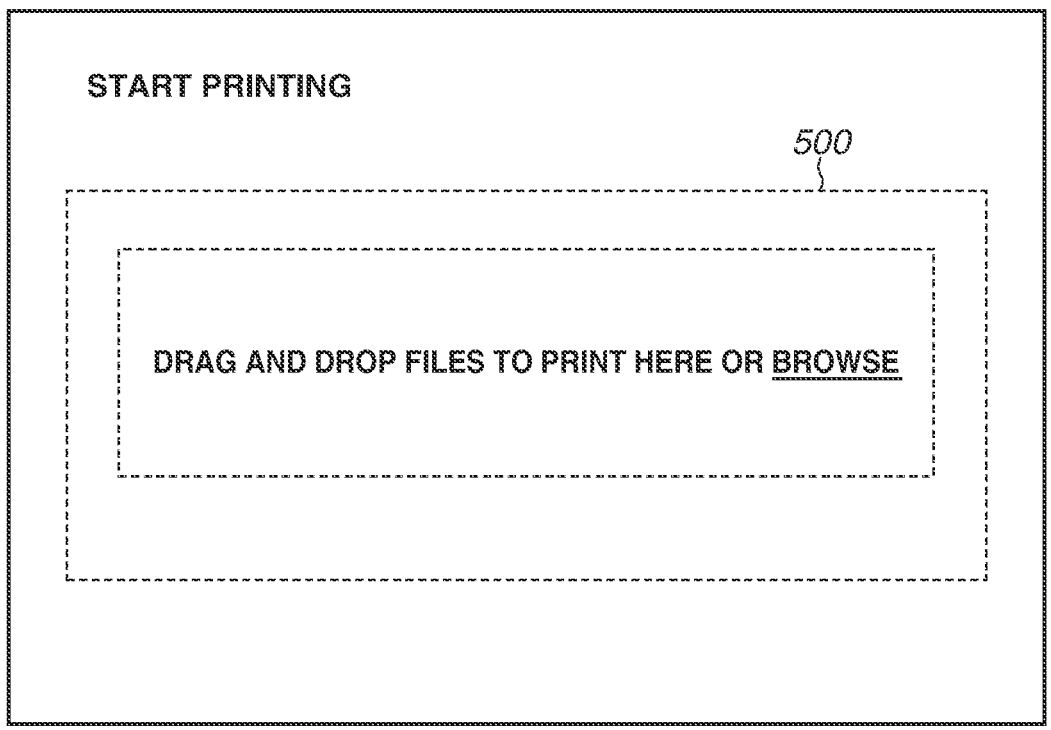
FIG. 5 illustrates a print request screen.

FIG. 5 illustrates an example of a print request screen displayed on the web UI client on the client terminal 100a. A print data specification area 500 is a control group for providing the user with operations for specifying the print data 420. The user operates controls in the print data specification area 500 to specify a file or files to be printed as the print data 420.

Return to the description of FIG. 4. Receiving the print request S410 from the client terminal 100a, the tenant 102a adds a record to a print job information management table based on the print request S410, and transmits a print request response S411 to the client terminal 100a. The print request response S411 includes a print job identifier (ID) 421 issued.

Figure 6:
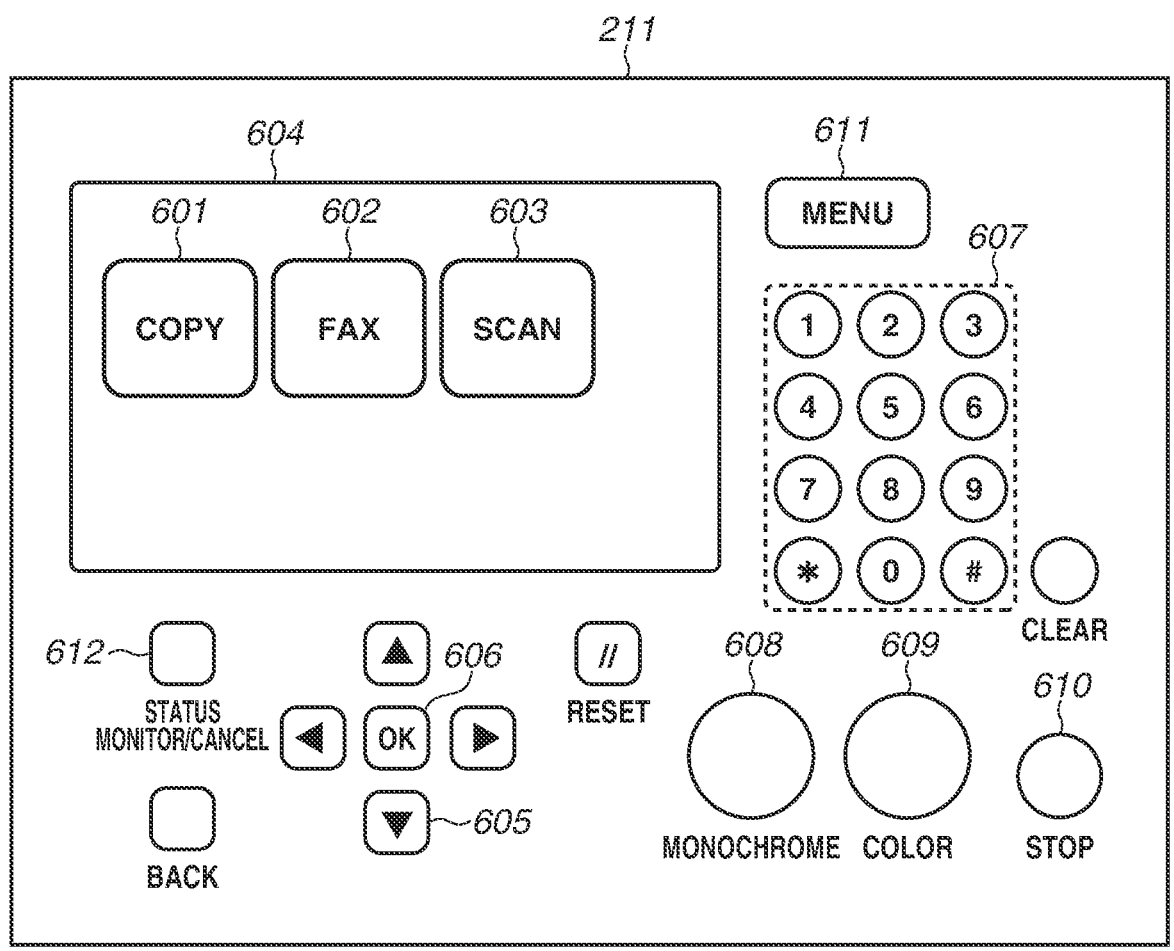
FIG. 6 is an explanatory diagram of an operation panel of the printing apparatus.

FIG. 6 is a diagram for describing the operation panel 211 of the printing apparatus 101. A display panel 604 includes a liquid crystal display (LCD). A button 601 is pressed in making a copy using the printing apparatus 101. If the button 601 is pressed, a copy operation screen appears on the display panel 604. A button 602 is pressed in sending a facsimile (FAX) using the printing apparatus 101. If the button 602 is pressed, a FAX operation screen appears on the display panel 604. A button 603 is pressed in making a scan using the printing apparatus 101. If the button 603 is pressed, a scan operation screen appears on the display panel 604. A numerical keypad 607 is used to enter numbers. An OK key 606 is used to settle on the display content of the display panel 604. Direction keys 605 are used in selecting a menu displayed on the display panel 604. Buttons 608 and 609 are used in making a monochrome copy and a color copy, respectively. A button 610 is used in stopping processing. A button 611 is used in displaying a menu screen for making settings of the printing apparatus 101. A button 612 is used to check a status, such as a list of print jobs received by the printing apparatus 101, of the printing apparatus 101. In the present exemplary embodiment, if the user operates the button 612 to give an instruction to display the list of print jobs, the printing apparatus 101 solves user authentication and authorization in cooperation with the tenants 102a and 102b, and obtains print job lists from the cloud print services. A series of operation screens related to the user authentication and authorization solution, the print job lists, and an operation screen thereof are displayed on the display panel 604.

Figure 7:
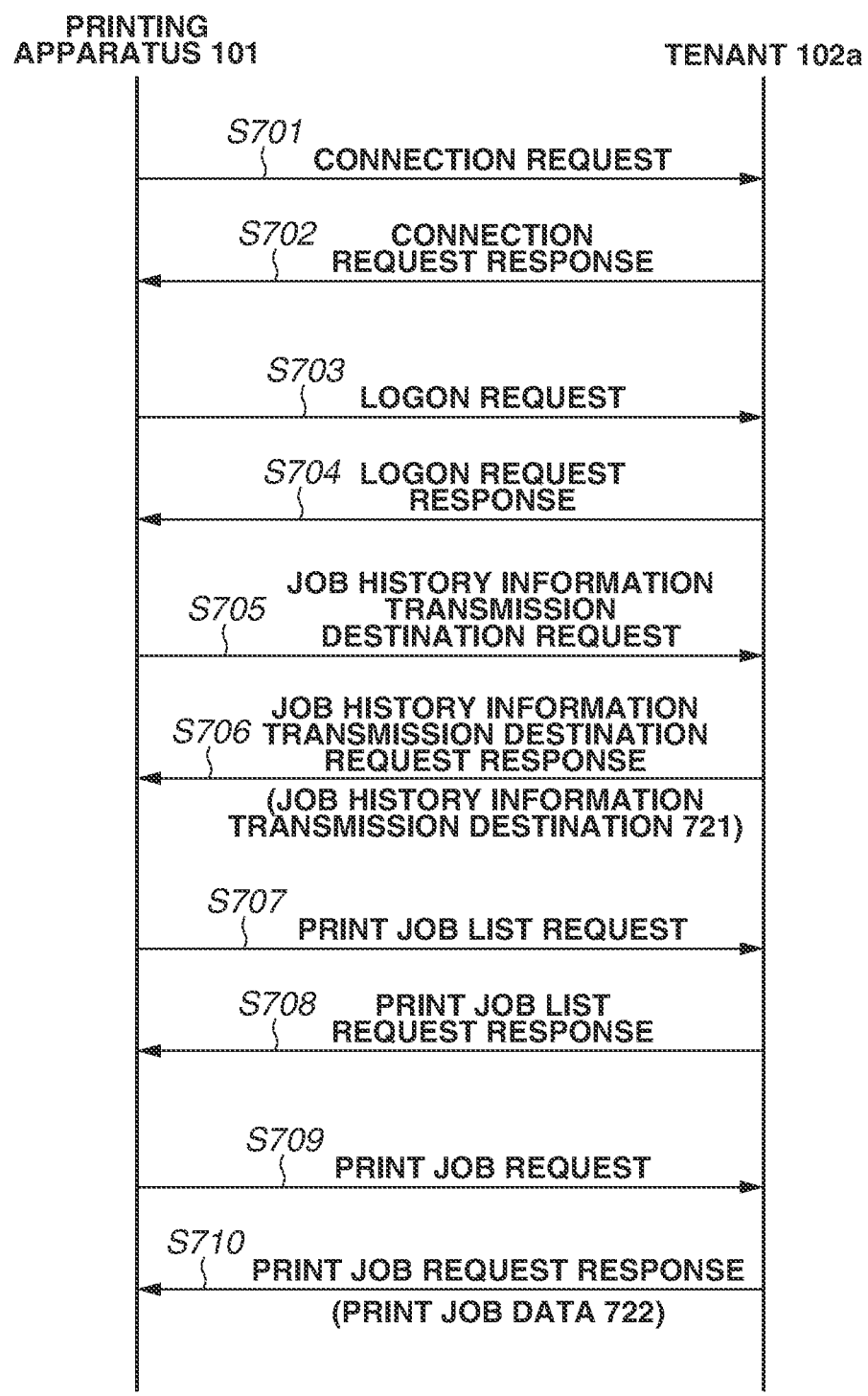
FIG. 7 illustrates a processing sequence for displaying a print job list and obtaining a print job.

FIG. 7 is a diagram for describing an example of a processing sequence for displaying a print job list and obtaining a print job in the printing system according to the present exemplary embodiment.

The user initially operates the operation panel 211 of the printing apparatus 101 to specify a connection destination tenant. The tenant is specified by inputting an access Uniform Resource Locator (URL) 720 provided by the tenant's administrator. The printing apparatus 101 transmits a connection request S701 to the tenant 102a based on the input of the access URL 720 by the user.

In response to the connection request S701 received, the tenant 102a transmits a connection request response S702 including a request for user credentials (user credentials request) to be used in an existing authentication and authorization process to the printing apparatus 101. Examples of the user credentials to be used in the existing authentication and authorization process include a username and a password.

The printing apparatus 101 displays a user credentials input screen on the operation panel 211 based on the user credentials request included in the received connection request response S702. The user inputs credentials by operating the user credentials input screen on the operation panel 211, and the printing apparatus 101 transmits a logon request S703 including the input credentials to the tenant 102a.

The tenant 102a solves the user authentication and authorization through the existing authentication and authorization process, using the credentials included in the received logon request S703. The tenant 102a then transmits a logon request response S704 to the printing apparatus 101.

The printing apparatus 101 receives the logon request response S704, performs logon processing, and transmits a job history information transmission destination request S705 for inquiring of the tenant 102a about the transmission destination of job history information to the tenant 102a.

management table to be described below for the combination of the access URL 720 and the job history information transmission destination 721. If there is a matching record (YES in step S801), the processing proceeds to step S804. If there is no match record (NO in step S801), the processing proceeds to step S802.

In step S802, the tenant connection control unit 307 generates a new connection destination tenant ID not recorded in the tenant connection management table.

In step S803, the tenant connection control unit 307 adds a new record to the tenant connection management table, and sets the connection tenant ID generated in step S802, the access URL 720, and the job history information transmission destination 721 into the new record.

In step S804, the tenant connection control unit 307 obtains the connection destination tenant ID from the record matching the combination of the access URL 720 and the job history information transmission destination 721.

In step S805, the tenant connection control unit 307 identifies the connection destination based on the job history information transmission destination request response S706, using the connection destination tenant ID.

An example of the tenant connection management table managed by the printing apparatus 101 will be described. The tenant connection management table stores identification information for identifying a tenant and access information about the tenant in association with each other. Table 1 illustrates a part of the tenant connection management table for describing the present exemplary embodiment. As described with reference to the flowchart illustrated in FIG. 8, the printing apparatus 101 uniquely identifies connection destination tenants from the combination of the access URL 720 and the job history information transmission destination 721, and distinguishes the connection destination tenants using the connection determination tenant IDs.

TABLE 1

Tenant connection management table

| Connection destination tenant ID | Access URL | Job history information transmission destination |
|---|---|---|
| TA001 | https://ta.cprints.xxxxx/ | https://ta.cprints.xxxxx/log1/soc |
| TB002 | https://tb.cprints.xxxxx/ | https://tb.cprints.xxxxx/log/soc |
| TA003 | https://ta.cprints.xxxxx/ | https://ta.cprints.xxxxx/log2/soc |

In response to the job history information transmission destination request S705 received, the tenant 102a transmits a job history information transmission destination request response S706 including information about a job history information transmission destination 721 to the printing apparatus 101. Here, the printing apparatus 101 receives, as the information about the job history information transmission destination 721, identification information for identifying the cloud print service that transmits a print job to be received as a print job request response S710.

Figure 8:
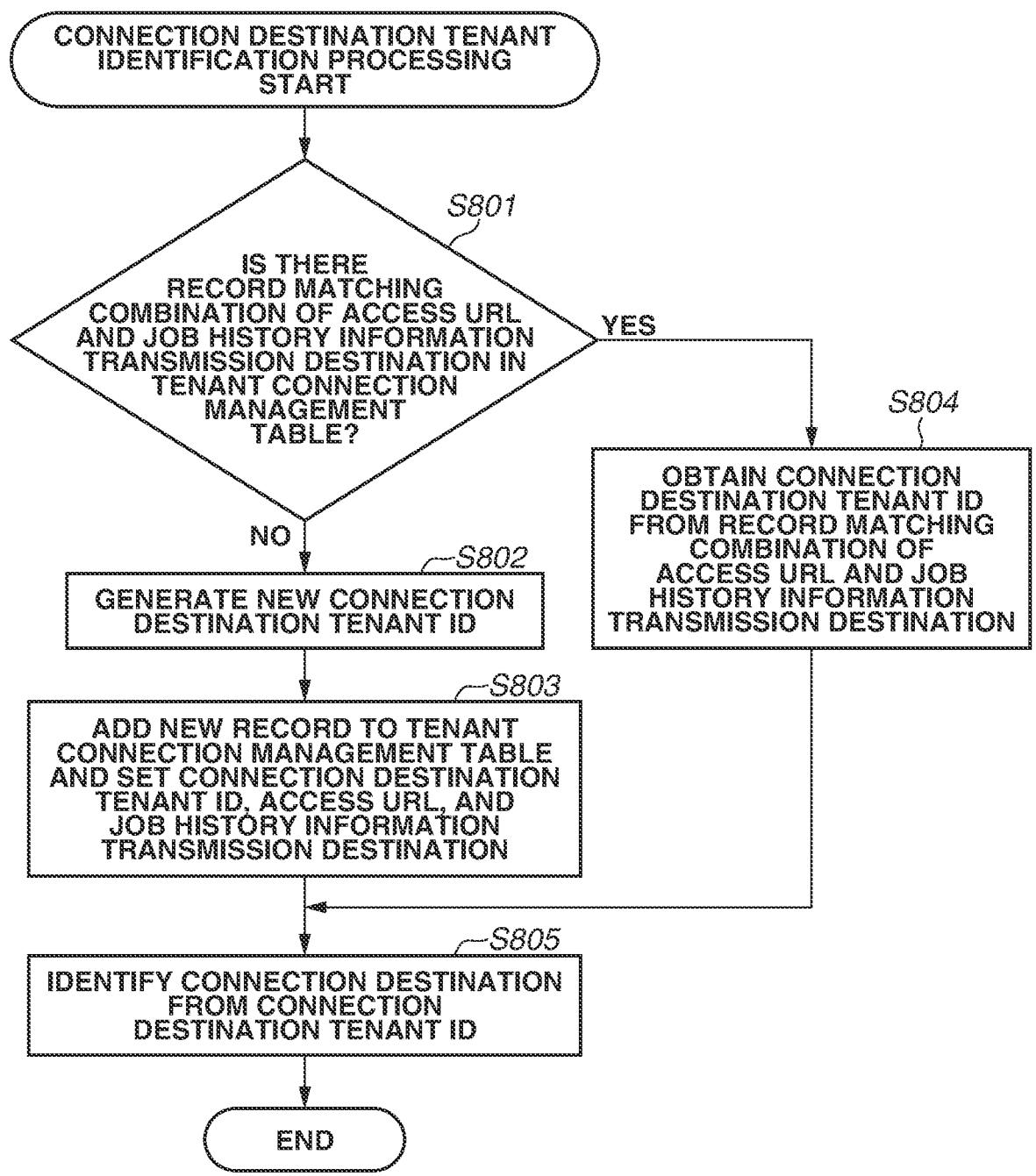
FIG. 8 is a flowchart illustrating processing where the printing apparatus manages connection destination tenant information.

The management of connection destination tenant information used by the printing apparatus 101 will now be described with reference to FIG. 8. FIG. 8 is a flowchart illustrating an example of processing where the printing apparatus 101 according to the present exemplary embodiment stores and manages connection destination tenant information in receiving the job history information transmission destination request response S706.

In step S801, the tenant connection control unit 307 of the printing apparatus 101 runs a query on a tenant connection Return to the description of FIG. 7. With the connection destination based on the job history information transmission destination request response S706 identified from the connection destination tenant ID in the flowchart illustrated in FIG. 8, the printing apparatus 101 transmits a print job list request S707 to the tenant 102a.

In response to the print job list request S707 received, the tenant 102a extracts information about print jobs managed in association with the user from the print job information management table, and transmits the information to the printing apparatus 101 as a print job list request response S708.

The printing apparatus 101 receives the print job list request response S708 from the tenant 102a, and displays the print job list included therein on the display panel 604.

The job history information transmission destination request S705 and the job history information transmission destination request response S706 may be transmitted and received at any time between the logon request response S704 and the print job request response S710. An exception is a case where the cloud service connected to the printing apparatus 101 will not be changed between when the printing apparatus 101 receives the print job data 722 and when the printing apparatus 101 transmits history information about the print job. In such a case, the job history information transmission destination request S705 and the job history information transmission destination request response S706 may be transmitted and received at any time between the logon request response S704 and the transmission of the history information about the print job.

print status lists information indicating the processing statuses of the print jobs by the printing apparatus 101. In this example, the print statuses are expressed by character strings. However, the print statuses may be stored using codes defined between the printing apparatus 101 and the tenants 102a and 102b in advance. A transmission flag lists flags for identifying whether the respective records have been transmitted to a tenant as job history information. In this example, the transmission flags are expressed by character strings. However, the transmission flags may be stored in codes defined by the printing apparatus 101 in advance.

TABLE 2

Job history information management table

| Intra-printing apparatus job ID | Tenant-issued print job ID | Print job data | Connection destination tenant ID | User | Print status | Transmission flag |
|---|---|---|---|---|---|---|
| A0001 | JA0002 | (job data 1) | TA001 | USER A | ready | (null) |
| A0002 | JA0003 | (job data 2) | TA001 | USER A | processed | (null) |
| A0003 | JBM0014 | (job data 3) | TB002 | USER C | done | done |

Figure 9:
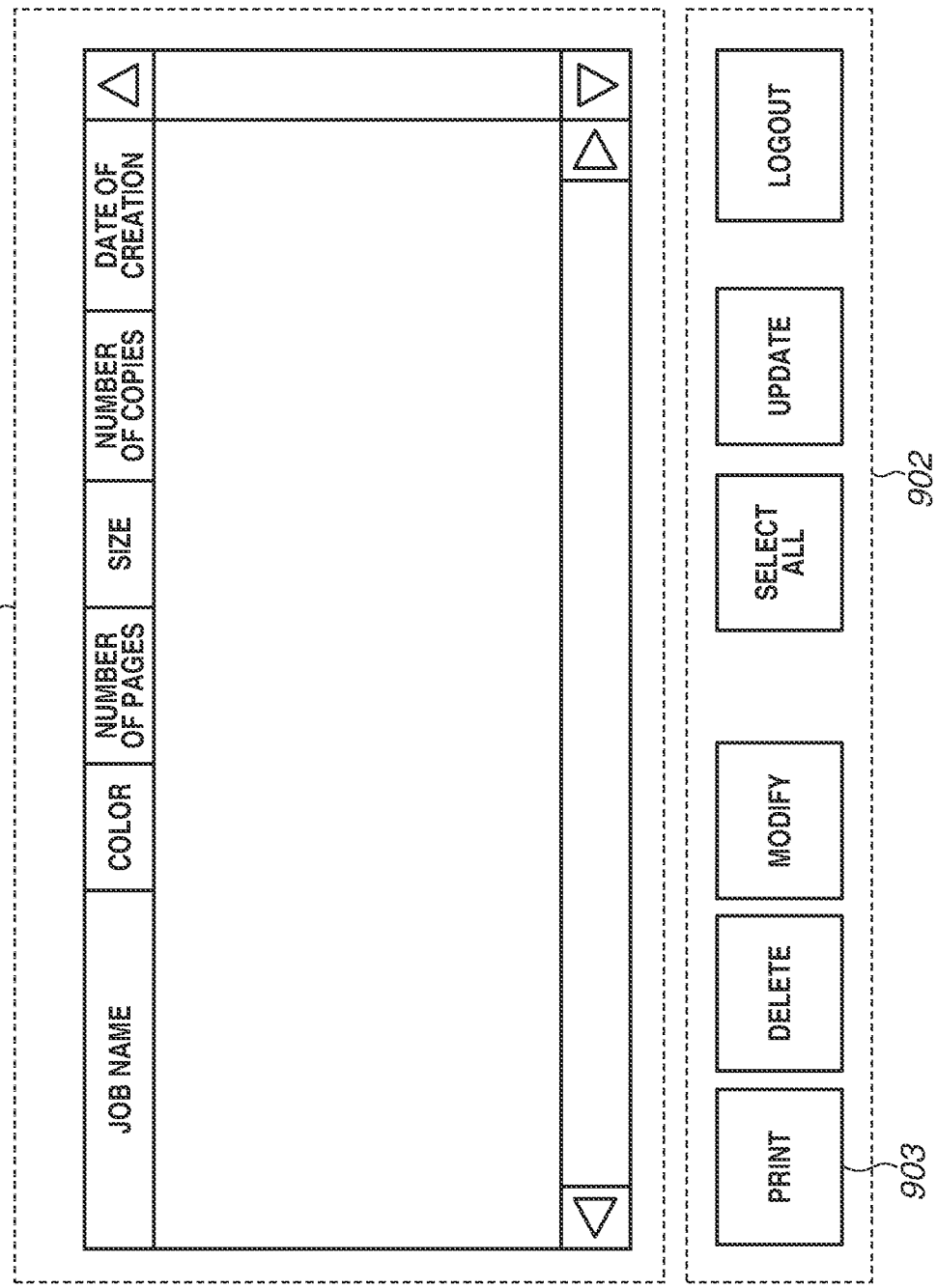
FIG. 9 illustrates a print job operation screen.

FIG. 9 illustrates an example of a print job operation screen displayed on the display panel 604. A print job list display section 901 displays the print job list included in the print job list request response S708. A print job operation section 902 includes a group of buttons for issuing instructions about the operation of a print job currently selected in the print job list display section 901. The print job operation section 902 includes a print instruction button 903.

With the print job list displayed on the display panel 604 of the printing apparatus 101, the user selects a print job in the print job list display section 901, and operates the print button 903 to issue an instruction to print the print job. The printing apparatus 101 transmits a print job request S709 including the print job ID to the tenant 102a based on the user's instruction.

The tenant 102a identifies the print job based on the print job ID included in the print job request S709 received, and transmits the print job request response S710 including the print job data 722 to the printing apparatus 101.

The printing apparatus 101 then performs print processing using the print job data 722 received as the print job request response S710. Job history information including the print job ID issued by the tenant 102a, the print job data 722, the connection destination tenant ID, the print-instructing user, and a print status is recorded and managed by the job history processing unit 308 of the printing apparatus 101.

Figure 10:
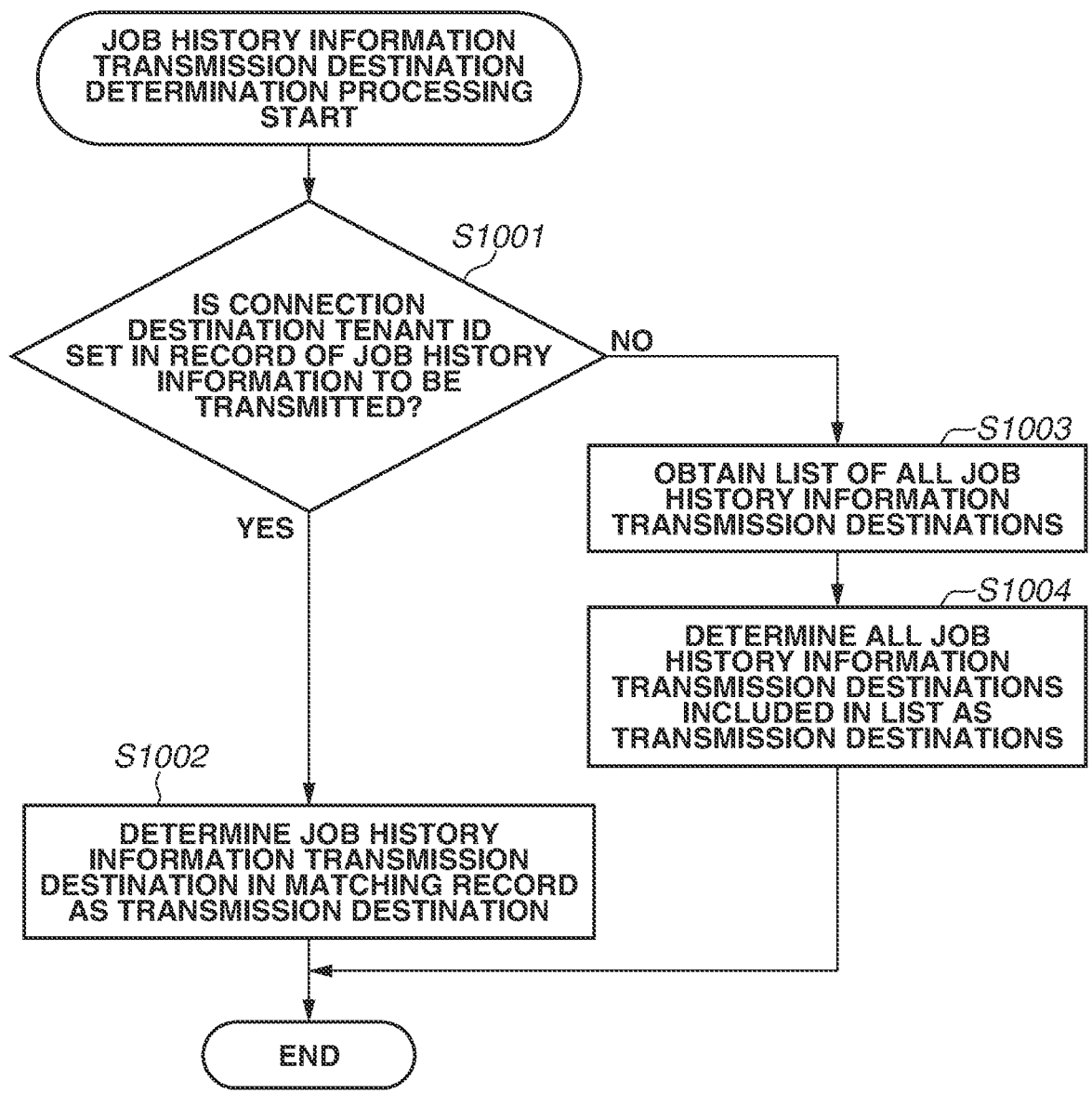
FIG. 10 is a flowchart illustrating processing where the printing apparatus determines a transmission destination or destinations of job history information.

An example of the job history information management table managed by the printing apparatus 101 will be described. Table 2 illustrates a part of the job history information management table for describing the present exemplary embodiment. An intra-printing apparatus job ID lists IDs for uniquely identifying print jobs in the printing apparatus 101. By contrast, a tenant-issued print job ID lists IDs for uniquely identifying the print jobs in the tenants 102a and 102b, issued by the tenant 102a and 102b. Print job data lists pieces of data each including a job file and a set of job properties, such as color, the number of pages, size, and the number of copies. A connection destination tenant ID lists connection destination tenant IDs identified by the processing described with reference to FIG. 8. A user lists information for identifying the print-instructing users. A The processing where the printing apparatus 101 transmits the job history information to the tenants 102a and 102b is performed asynchronously with the print processing. FIG. 10 is a flowchart illustrating an example of processing where the printing apparatus 101 determines a transmission destination tenant of job history information in the present exemplary embodiment.

In step S1001, the job history processing unit 308 of the printing apparatus 101 checks whether a connection destination tenant ID is set in a record of job history information to be transmitted. If a connection destination tenant ID is set (YES in step S1001), the processing proceeds to step S1002. If no connection destination tenant ID is set (NO in step S1001), the processing proceeds to step S1003.

In step S1002, the job history processing unit 308 runs a query on the tenant connection management table using the connection destination tenant ID, extracts a job history information transmission destination from the matching record, and determines the extracted job history information transmission destination as the transmission destination of the job history information to be transmitted.

In step S1003, the job history processing unit 308 obtains a list of all the job history information transmission destinations from all the records of the tenant connection management table.

In step S1004, the job history processing unit 308 determines all the job history information transmission destinations included in the list obtained in step S1003 as the transmission destinations of the job history information to be transmitted.

A series of procedures up to the determination of the transmission destination(s) of the job history information by the printing apparatus 101 during cloud printing using the printing apparatus 101 and the tenants 102a and 102b has been described above. Embedding a connection destination tenant ID managed in the tenant connection management table into the record of the job history information management table provides the effect that the transmission destination of the job history information is identified and the job history information is properly transmitted to the tenant managing the print job. In other words, the printing apparatus 101 can transmit execution history information about the print job to the cloud print service from which the print job is transmitted.

On the other hand, embedding no connection destination tenant ID into the record of the job history information provides the effect that the job history information can be transmitted to all the history information transmission destinations managed by the printing apparatus 101.

Figure 11:
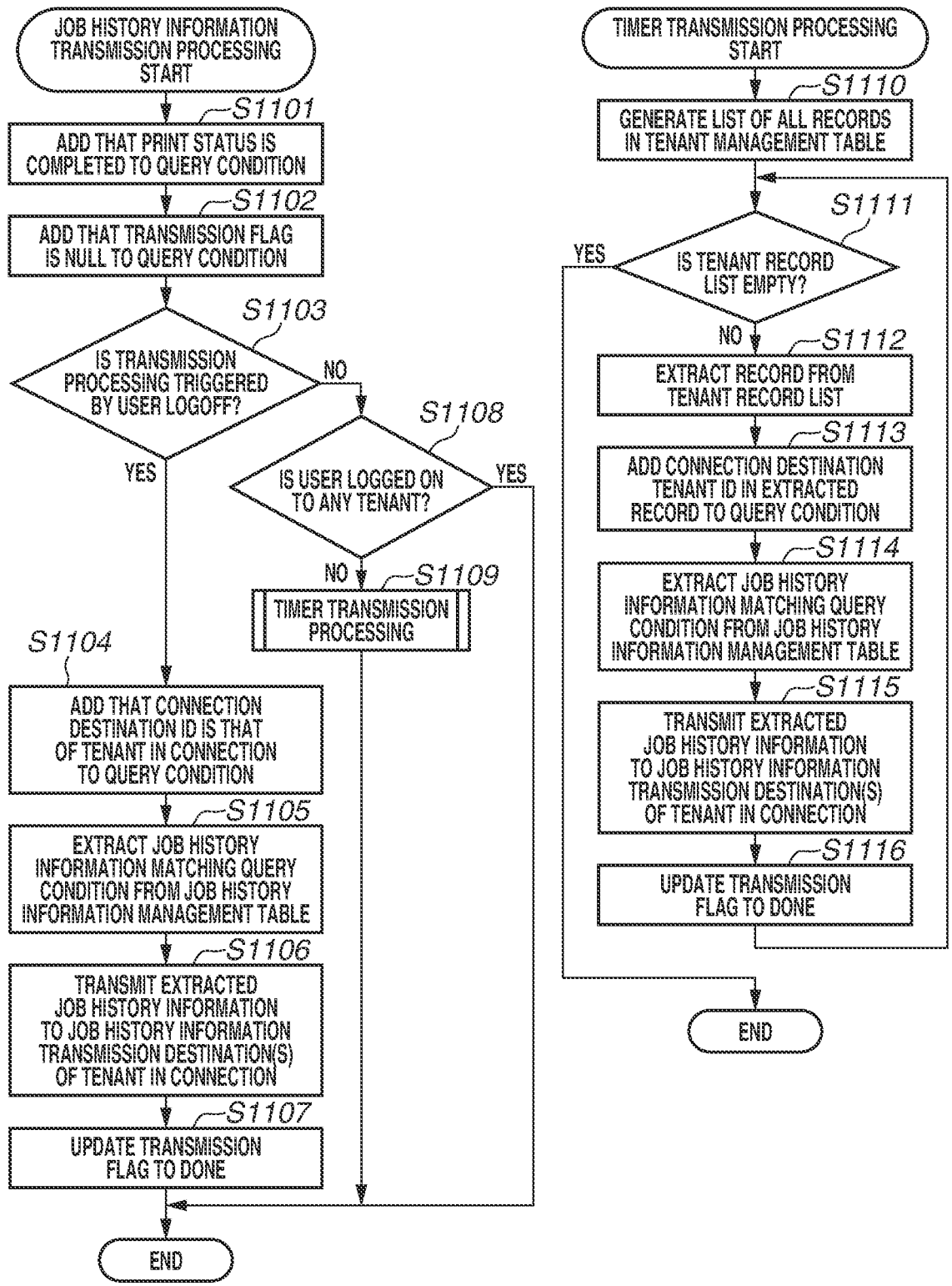
FIG. 11 is a flowchart illustrating processing where the printing apparatus transmits job history information.

FIG. 11 is a flowchart illustrating an example of processing where the printing apparatus 101 according to the present exemplary embodiment transmits job execution history information to the tenants 102a and 102b asynchronously with the print processing. In the present exemplary embodiment, the flowchart is started either at timing when the user operates the display panel 604 of the printing apparatus 101 to log off from the tenant after the execution of a print job or at timing with a predetermined interval time has elapsed.

In step S1101, the job history processing unit 308 of the printing apparatus 101 adds that the print status is done to the query condition for the job history information management table.

In step S1102, the job history processing unit 308 adds that the transmission flag is null (unsent) to the query condition for the job history information management table.

In step S1103, the job history processing unit 308 determines whether this transmission processing is triggered by a user logoff (transmission before logoff processing) or triggered by the lapse of the interval time. If the transmission processing is triggered by a user logoff (YES in step S1103), the processing proceeds to step S1104. If the transmission processing is triggered by the lapse of the interval time (timer transmission processing) (NO in step S1103), the processing proceeds to step S1108.

In step S1104, the job history processing unit 308 adds that the connection destination tenant ID is that of the tenant currently in connection and to be logged off to the query condition for the job history information management table.

In step S1105, the job history processing unit 308 extracts job history information matching the query condition from the job history information management table.

In step S1106, the job history processing unit 308 transmits the job history information extracted in step S1105 to the job history information transmission destination(s) of the tenant in connection.

In step S1107, the job history processing unit 308 updates the transmission flag in the record of the job history information extracted in step S1105 to done. The job history information transmission processing ends.

In step S1108, the job history processing unit 308 determines whether the user is logged on to any tenant. If the user is logged on to any tenant (YES in step S1108), the job history information transmission processing ends. If the user is not logged on to any tenant (NO in step S1108), the processing proceeds to step S1109.

In step S1109, the job history processing unit 308 starts processing for transmitting the job history information having reached the interval time (timer transmission processing). The processing proceeds to step S1110.

In step S1110, the job history processing unit 308 generates a list of all the records in the tenant connection management table. This list will be referred to as a tenant record list.

In step S1111, the job history processing unit 308 determines whether the tenant record list is empty. If the tenant record list is not empty (NO in step S1111), the processing proceeds to step S1112. If the tenant record list is empty (YES in step S1111), the timer transmission processing ends.

In step S1112, the job history processing unit 308 extracts a record from the tenant record list.

In step S1113, the job history processing unit 308 adds the connection destination tenant ID in the record extracted in step S1112 to the query condition for the job history information management table.

In step S1114, the job history processing unit 308 extracts job history information matching the query condition from the job history information management table.

In step S1115, the job history processing unit 308 transmits the job history information extracted in step S1114 to the job history information transmission destination(s) of the record extracted in step S1112.

In step S1116, the job history processing unit 308 updates the transmission flag in the record of the job history information extracted in step S1114 to done.

The processing described with reference to FIG. 11 implements, at timing when the user logs off from a tenant, processing for transmitting the job history information to only the tenant to log off. At timing when the predetermined interval time has reached, processing for transmitting pieces of job history information yet to be transmitted to respective intended tenants is implemented. The job history information transmission processing is asynchronous with the print processing, and provides the effect that the update speed of the job history information in the tenants can be improved and the repetition of the job history information transmission processing by the printing apparatus 101 can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-180823, filed Nov. 5, 2021, which is hereby incorporated by reference herein in its entirety.

What is claimed is:

1. A printing apparatus that does not simultaneously connect to more than one cloud print service, the printing apparatus comprising:
    an execution unit configured to execute a print job received from any one of a plurality of cloud print services;
    a storage unit configured to store identification information for identifying a cloud print service from which the print job is transmitted; and
    a transmission unit configured to use the stored identification information to switch a cloud print service to be connected to the cloud print service from which the print job is transmitted, and transmit execution history information about the executed print job to the cloud print service from which the print job is transmitted.

2. The printing apparatus according to claim 1, wherein the storage unit is configured to store the identification information about the cloud print service in association with access information about the cloud print service.

3. The printing apparatus according to claim 1, further comprising an obtaining unit configured to, after logon processing on the cloud print service is performed, obtain the identification information for identifying the cloud print service from which the print job is transmitted from the cloud print service,
    wherein the storage unit is configured to store the obtained identification information.

4. The printing apparatus according to claim 1, wherein the transmission unit is configured to, after the print job is executed and before logoff processing on the cloud print service is performed, transmit the execution history information including a result of execution of the print job to the cloud print service from which the print job is transmitted, using the stored identification information.

5. A control method for controlling a printing apparatus that does not simultaneously connect to more than one cloud print service, the control method comprising:
    executing a print job received from any one of a plurality of cloud print services;
    storing identification information for identifying a cloud print service from which the print job is transmitted; and
    using the stored identification information to switch a cloud print service to be connected to the cloud print service from which the print job is transmitted, and transmitting execution history information about the executed print job to the cloud print service from which the print job is transmitted.

6. The control method according to claim 5, wherein the identification information about the cloud print service is stored in association with access information about the cloud print service.

7. The control method according to claim 5, further comprising, after logon processing on the cloud print service is performed, obtaining the identification information for identifying the cloud print service from which the print job is transmitted from the cloud print service,
    wherein the obtained identification information is stored as the identification information.

8. The control method according to claim 5, wherein after the print job is executed and before logoff processing on the cloud print service is performed, the execution history information including a result of execution of the print job is transmitted to the cloud print service from which the print job is transmitted, using the stored identification information.

9. A non-transitory computer readable storage medium that stores one or more programs, the one or more programs including instructions, which when executed by one or more processors of a printing apparatus that does not simultaneously connect to more than one cloud print service, cause the printing apparatus to perform:
    executing a print job received from any one of a plurality of cloud print services;
    storing identification information for identifying a cloud print service from which the print job is transmitted; and
    using the stored identification information to switch a cloud print service to be connected job to the cloud print service from which the print job is transmitted, and transmitting execution history information about the executed print job to the cloud print service from which the print job is transmitted.

10. The non-transitory computer-readable storage medium according to claim 9, wherein the identification information about the cloud print service is stored in association with access information about the cloud print service.

11. The non-transitory computer-readable storage medium according to claim 9,
    wherein the instructions, when executed by the one or more processors, further cause the printing apparatus to perform, after logon processing on the cloud print service is performed, obtaining the identification information for identifying the cloud print service from which the print job is transmitted from the cloud print service, and
    wherein the obtained identification information is stored as the identification information.

12. The non-transitory computer-readable storage medium according to claim 9, wherein after the print job is executed and before logoff processing on the cloud print service is performed, the execution history information including a result of execution of the print job is transmitted to the cloud print service from which the print job is transmitted, using the stored identification information.

* * * * *